March 31, 1970     C. G. JOHNSON     3,503,317
CAMERA FOR PROVIDING MULTIPLE EXPOSURES ON ONE AREA OF FILM
Filed Oct. 17, 1968     3 Sheets-Sheet 1
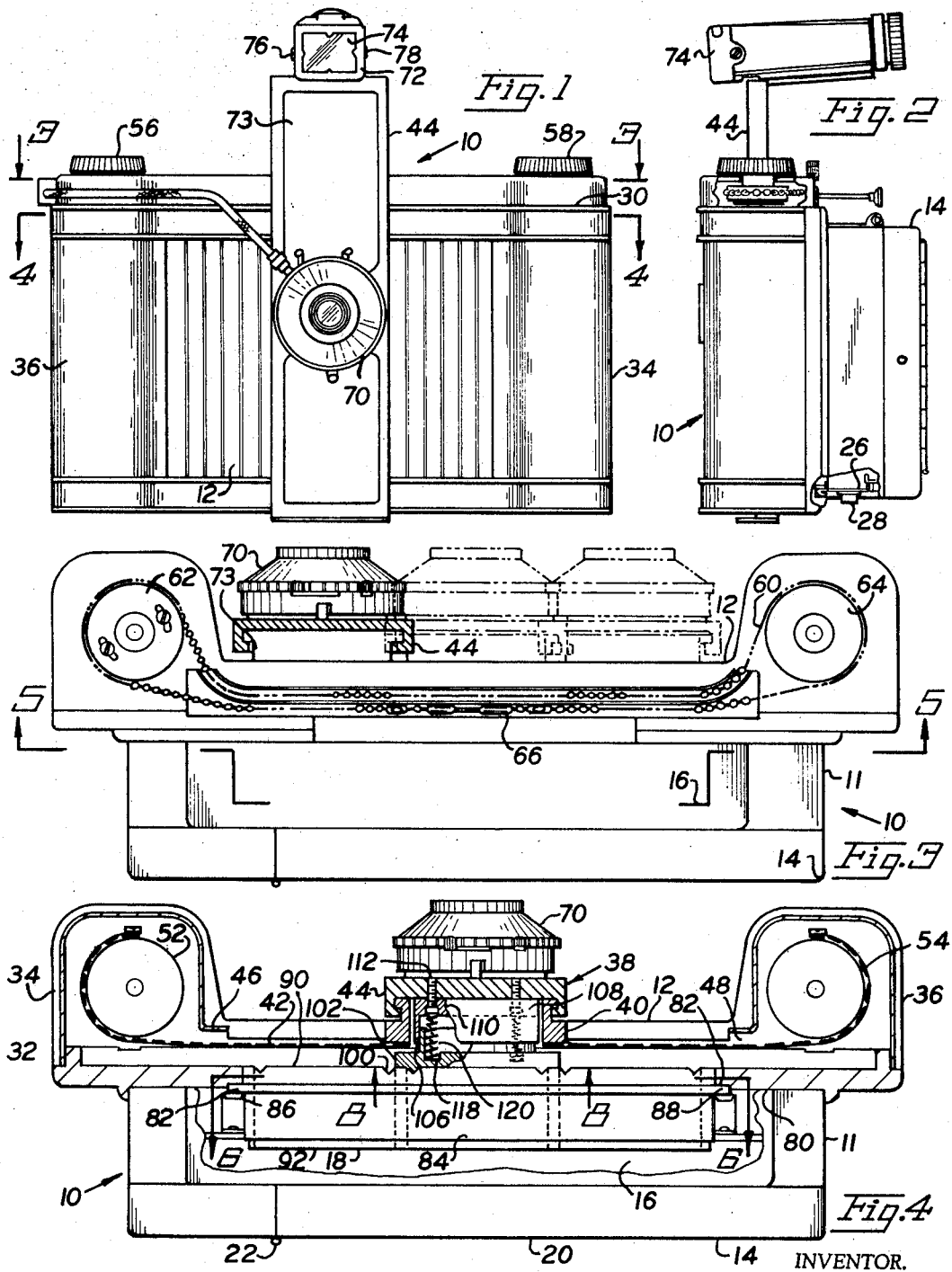
INVENTOR.
CLAYTON G. JOHNSON
BY
*Edward H Loveman*
ATTORNEY March 31, 1970     C. G. JOHNSON     3,503,317
CAMERA FOR PROVIDING MULTIPLE EXPOSURES ON ONE AREA OF FILM
Filed Oct. 17, 1968     3 Sheets-Sheet 2
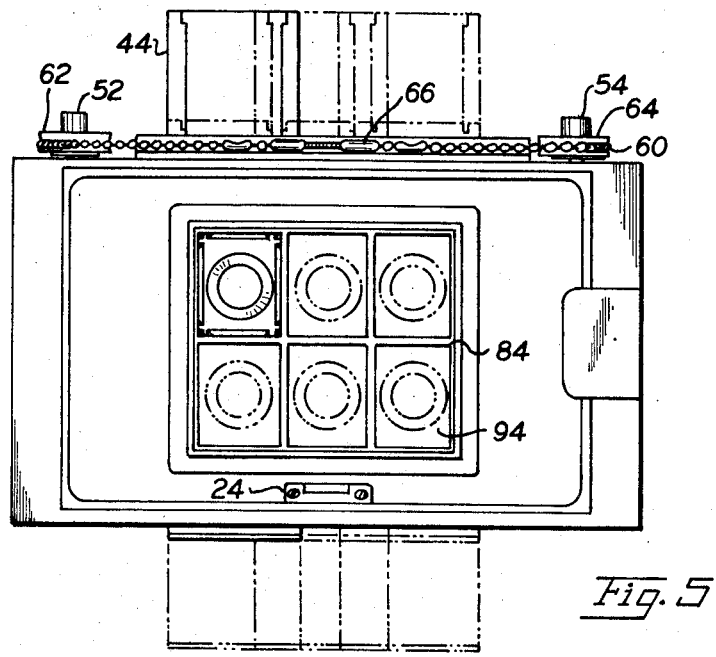
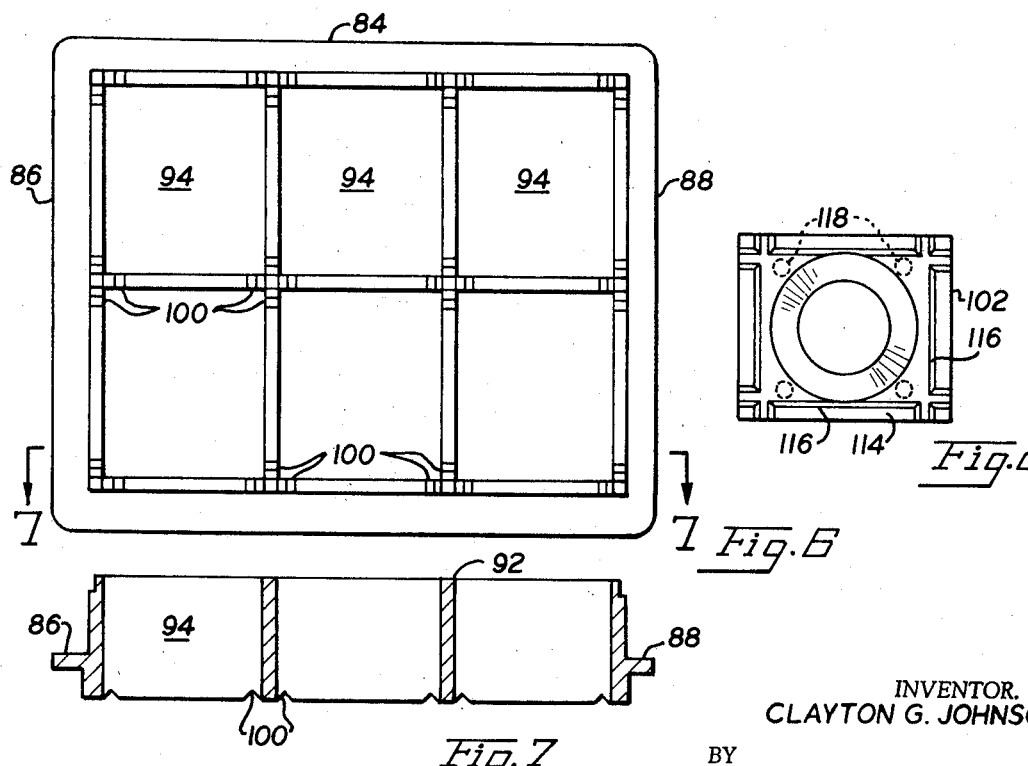
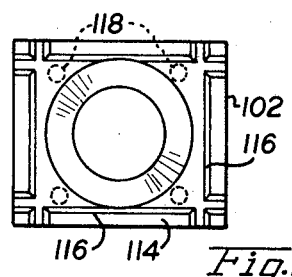
INVENTOR.
CLAYTON G. JOHNSON
BY
*Edward H Loveman*
ATTORNEY March 31, 1970  C. G. JOHNSON  3,503,317
CAMERA FOR PROVIDING MULTIPLE EXPOSURES ON ONE AREA OF FILM
Filed Oct. 17, 1968  3 Sheets-Sheet 3

INVENTOR.
CLAYTON G. JOHNSON
BY
Edward H Loveman
ATTORNEY

United States Patent Office 3,503,317
Patented Mar. 31, 1970

3,503,317
CAMERA FOR PROVIDING MULTIPLE EXPOSURES ON ONE AREA OF FILM
Clayton G. Johnson, Motley, Minn., assignor to Multi-Photo Camera Corporation, Motley, Minn.
Filed Oct. 17, 1968, Ser. No. 768,330
Int. Cl. G03b 5/02
U.S. Cl. 95—36      7 Claims

ABSTRACT OF THE DISCLOSURE

A camera for providing multiple exposures on successive positions of a single area of film by means of an insert block providing a plurality of portions of the area, which portions each have a predetermined size and configuration. A camera lens assembly is selectively moved and aligned with the predetermined areas of the insert block and is detented therewith by means of mating raised and recess portions in corresponding sections of the insert block and the camera lens assembly.

---

This invention relates to photographic cameras of the type in which a plurality of exposures are made on successive sections of a film or plate of predetermined area and more particularly, the invention pertains to such a camera wherein the lens is selectively movable into alignment with a section of film desired to be exposed.

Cameras of this type are generally in wide demand and are particularly useful for the purpose of making identification or passport photographs or the like. Another field of use for these cameras is that of microphotography in which it is desired to photograph a plurality of subjects such as the pages of a document, for example, on a single plate or area of film.

In accordance with the present invention, the size of the image produced by the camera is determined by a detachable mounted insert block which has a plurality of light sealed passageways and is supported in the housing of the camera between a photosensitive surface and a lens slide assembly. The lens slide assembly is slidably mounted in the housing of the camera for movement in any given direction with respect to the film. For effecting lateral or horizontal movement of this slide assembly with respect to the housing, and for maintaining the housing in light sealed condition during this movement, a sheet or curtain of flexible, opaque material of relatively high tensile strength extends from each side of the slide assembly to the respective opposite sides of the camera housing where it is wound on a pair of roller shafts mounted in the housing. By winding up the sheet on one shaft, the slide assembly will be drawn toward that roller. At the same time, the sheet will unwind from the opposite shaft so that the varying sized spaces adjacent the opposite edges of the slide assembly will always be completely covered. The slide assembly is manually moved in the longitudinal or vertical direction by merely grasping the slide assembly and moving it in the desired direction.

Both horizontal and vertical alignment and detenting of the slide assembly with respect to any one of the passageways in the insert block is provided by an indexing means comprising a detent plate assembly having an inter-engaging projection adapted to be received in one of a plurality of recesses in the insert block.

Accordingly, it is a primary object of the invention to provide a novel and improved lens supporting and moving arrangement for a multi-exposure camera which is well sealed against the undesired entrance of light during movement of the lens and for stationary positions of the lens.

It is a further object of the present invention to provide a camera of the class described which is constructed to insure that the camera remains well light sealed at all times.

Another object of the invention is to provide accurate indexing means in a multiple-exposure camera for aligning and detenting the lens with the particular section of the film which is desired to be exposed.

These and other objects and many of the attendant advantages of this invention will be readily appreciated as the same becomes better understood by reference to the following detailed description when taken in conjunction with the accompanying drawings wherein:

FIG. 1 is a front elevational view of a camera in accordance with the preferred embodiment of the present invention, a portion being broken away to show details of construction;

FIG. 2 is a side elevational view of the camera, a portion being broken away to show details of construction;

FIG. 3 is a horizontal section through the camera taken on the line 3—3 of FIG. 1;

FIG. 4 is a horizontal section through the camera taken on line 4—4 of FIG. 1;

FIG. 5 is a partial sectional view taken on the line 5—5 of FIG. 3;

FIG. 6 is a detail plan view along line 6—6 in FIG. 4;

FIG. 7 is a sectional view along line 7—7 in FIG. 6;

FIG. 8 is a detail plan view along line 8—8 in FIG. 4; and

Figure 9:
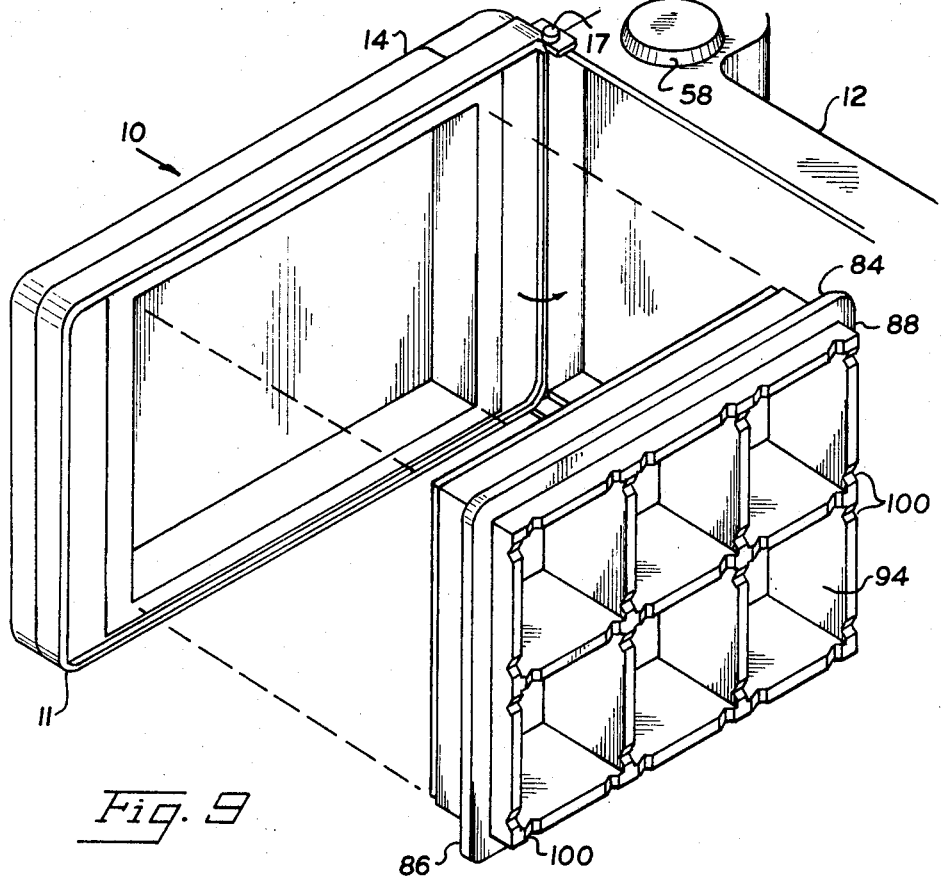
FIG. 9 is a partial prospective view showing the camera with the front section open.

Referring now to the drawings wherein like reference numerals designate like or corresponding parts throughout the figures thereof, there is shown in FIG. 1 a camera generally designated by reference numeral 10. Camera 10 has a housing 11 which is divided into a front section 12 and a rear section 14 (FIG. 2), sections 12 and 14 being preferably pivotally connected by a hinge pin 17 in a conventional manner (FIG. 9). A suitable latch, not shown, may be provided on the housing 11 for securing the front section 12 and the rear section 14 together.

The film or plate to be exposed is supported in the rear section 14 of the housing 11. As illustrated in FIG. 4, rear section 14 is adapted to support a film pack 16, which supports the photosensitive surface of the film generally in the plane indicated by the line 18. A door 20 is hingedly attached to the rear section 14 as indicated at 22 and provides access to the interior of rear section 14 for changing the film pack whenever desired. As is conventional in the camera art, the door 20 may carry a leaf spring (not shown) which will bear against the back of the film pack 16 when the door 20 is closed so as to hold it firmly in place in the housing. A suitable latch may include a latch plate 26 (FIG. 2) to hold the door 20 in its closed position. A latch button 28 may be provided to disengage latch plate 26 and thereby permit the door 20 to open.

The front section 12 of housing 11 is generally frame-like in construction and consists of an upper rail 30 (FIG. 1) and a lower rail 32 (FIG. 4) which are joined together and supported in spaced, parallel relation at their respective opposite ends by a pair of hollow, vertically extending roller shaft enclosures 34 and 36. Slidably mounted on the upper and lower rails 30 and 32, for movement in the normally horizontal direction, is a lens supporting slide assembly generally indicated as reference numeral 38. As best seen in FIG. 4, slide 38 is of built-up construction, and consists first of a rear slide block 40 which may be slidably received at its upper and lower edges in suitable grooves in the upper rail 30 and lower rail 32, respectively. The other parts of the slide assembly 38 may include a suitable pair of spacer plates (not shown) between which is clamped a flexible opaque sheet 42, to be described in greater detail below, and finally a front lens mounting slide plate 44.

The flexible opaque sheet 42 extends laterally from both sides of the slide assembly 38 and enters the vertical roller shaft enclosures 34 and 36 through narrow slots 46 and 48 therein. Within the roller shaft enclosures 34 and 36, the opposite ends of the sheet 42 are attached to and wound on a pair of vertically extending roller shafts 52 and 54 which are journaled within the roller shaft enclosure by means of suitable bearings (not shown). Because the force for moving the slide assembly 38 is transmitted through the sheet 42, it should be made of a material possessing a relatively high tensile strength. A cured natural "black" rubber sheet or curtain, which is reinforced by being vulcanized with strips of cord or sheet metal has been found to be suitable for this purpose. Each of the roller shafts 52 and 54 is provided with a knurled knob, 56 and 58 respectively (FIG. 1), which may selectively grasped by the photographer for winding up the sheet 42 and thus horizontally moving the slide assembly 38 toward whichever of the shafts is being manipulated.

If desired, the sheet 42 may be positively moved with a minimum of backlash by interconnecting the roller shafts 52 and 54 with an endless chain member 60 (FIG. 3) which is wound about pulleys 62 and 64, thereby placing the roller shafts 52 and 54 in driving relationship. In order to remove any slack which may be caused by means of the chain or the pulleys, a turnbuckle 66 may be placed in the chain to be adjusted as desired.

Although not shown, the vertical slidable front lens mounting plate 44 may have a centrally located threaded opening for the reception of a lens and shutter assembly 70 and may include a rearwardly extending light tube. A suitable elongated slot 73 (FIG. 1) in the lens supporting assembly 38 is adapted to transmit light rearwardly from the light tube toward the photosensitive surface.

At is upper end, the lens mounting plate 44 may carry a bracket 72 (FIG. 1) in which is removably secured a view finding element 74. By way of example, the view finder 74 may be made of plastic and may be frictionally retained by a pair of posts 76 and 58 extending upwardly from the bracket 72.

Any desired lens arrangement may be employed in the lens and shutter assembly 70, although, as indicated above, it is preferable that the lens be capable of projecting an image large enough to cover the entire film surface presented by the film pack 16. In the practice of the invention, this area is divided into a plurality of smaller areas so as to provide the multiple exposure capability of the camera.

Referring now to FIGS. 4 and 5, the means for dividing the film will be described. As there illustrated, the front section 12 of housing 11 is provided, generally centrally thereof, with a support wall 80, which includes an aperture 82 providing support for a removable insert block 84 having external flanges 86 and 88, respectively for limiting the depth of insertion of the block 84 in the aperture 82. If desired, conventional bias means such as leaf springs may be mounted in the rear section 14 of housing 11, to impart pressure on flanges 86 and 88, so as to maintain the insert block 84 firmly seated in aperture 82.

As best seen in FIG. 4, the insert block 84 is of such depth as to provide a front face 90 parallel to and in close proximity to the elongated slot 73 and a rear face 92 lying close to and parallel with the film surface 18. A plurality of passages 94 extend through the block 84 from the front face 90 to the rear face 92 thereof, each of these passages 94 defining when aligned with the light tube via slot 73, a closed light chamber between the lens and film. Thus, the particular section of film which lies adjacent the rear end of whichever passage 94 is aligned with the light tube may be exposed without exposing any of the other areas of the film. It should be pointed out that the distance between rear face 92 and film surface 18 has been exaggerated in the drawings. Actually, this distance should be made as small as possible so that light will not diffuse away from the particular section of film which is being exposed. Of course, all the surfaces within the camera are blackened.

Indexing means are provided for aligning and detenting the various positions of the lens and shutter assembly 70 with the passages 94. As illustrated in FIGS. 5 and 6 the insert block 84 has a rectangular array of pasages 94, there being 6 such passages arranged in two rows of three passages per row.

For indexing the lens and shutter assembly 70, the front face 90 of insert block 84 includes a plurality of spaced recesses in the form of V-shaped notches 100, as most clearly shown in FIGS. 4 and 7, which extend in both the horizontal and vertical directions. An indexing or detent plate 102 (FIG. 4) is adapted to be moved along the front face 90 of insert block 84, and in surface contact therewith. The detent plate 102 essentially is formed of a generally rectangular base portion 104, which contacts the front face 90 of insert block 84, and includes a cylindrical portion 106 which projects into the slide assembly 38.

The cylindrical portion 106 of detent plate 102 is encompassed by a hollow cylindrical block 108. Block 108 has a radially inwardly projecting flange 110 through which suitable fastener elements 112 mount cylindrical block 108 to lens mounting slide plate 44. In this manner, as the mounting plate 44 is moved horizontally through manipulation of roller knobs 56 and 58, or moved vertically along slide block 40, the cylindrical block 108 and detent plate 102 are moved correspondingly.

Referring to FIG. 8, there is shown in greater detail the detent plate 102. A surface 114 of detent plate base portion 104 is adapted to contact with front face 90 of insert block 84, and includes raised projections or V-shaped ridge portions 116, which extend in both the horizontal and vertical directions when the lens and shutter assembly 70 are aligned with a passage 94 of insert block 84, the projections 116 will mate with and insert themselves with the corresponding recesses or notches 100 in insert block 84. Since the spacings of the recesses 100 are coordinated to interfit with the raised portions 116, the detent plate 102 will seat itself firmly and in light-tight condition on insert block 84.

In order to maintain the contact between insert block 84 and detent plate 102, so as to provide a light-tight or sealed relationship, the detent plate 102 includes apertures 118 in the corners of the upper surface of the base portion 104. Each of the apertures 118 is adapted to receive a coiled compression spring 120 which engages the flange 110 on cylinder block 108 and thereby exerts a force which will move the detent plate 102 toward insert block 84. When the lens mounting plate 44 is moved, the projections 116 slide out of the recesses, and the compression springs 120 are compressed so as to move detent plate 102 away from insert block 84 and into cylinder block 108. As the mounting plate reaches a position wherein the lens and shutter assembly 70 are aligned with another passage 94 in the insert block 84, the projections 116 and recesses 100 will align and permit the surfaces 90 and 114 to contact under the urging of springs 120 thereby detenting the lens and shutter assembly to the aligned passage. It is a particular feature of this embodiment that even if one or more of the springs 120 become inoperative, the pressure created by the remaining spring or springs will be sufficient to provide a light sealed engagement between the detent plate 102 and insert block 84.

In order to provide the optimum conditions for mating and disengaging the projections 116 and notches 100, it has been found that a notch apex angle of about 90°, i.e. an engaging entrance or exit angle of 45° will provide the best operating results for the indexing of the lens and shutter assembly 70 and passages 94 in insert block 84.

It will be understood that while only one insert block has been illustrated and described herein, other insert blocks having any desired arrangement of passages may be provided, it being necessary only to provide a detent plate keyed to the particular geometrical arrangement selected.

Moreover, the passages may assume shapes other than the rectangular shape shown, and may be diamond shaped or circular for example.

As previously stated, the view finder 74 is removably mounted on the camera and it should now be apparent that this is done so that a view finder may be used which has an aperture of a size commensurate with the size of the particular insert block passage which is being employed. Alternatively, a view finder with an adjustable aperture may be employed.

The manner of using the camera should be apparent from the foregoing description. The following summary, however, may be of assistance to a full and complete understanding of the invention. Having selected the desired insert block and locating the desired passageway 94 in the camera, the photographer can begin to make his exposures. If an insert block such as the block 84 is used, that is, where the block has an array of passages in rows and columns, it will ordinarily be expedient to move the lens and shutter assembly to the right end (as viewed in FIG. 4) of the upper or first row to make the first exposure and then to proceed exposing successive films sections across the first row to the opposite left end thereof by rotation of knob 58. After exposure of the first row, the slide mounting plate 44 is lowered to move the lens and shutter assembly 70 into alignment with the next row of passages and the knob 56 is rotated to move the sheet 42 and thus the lens and shutter assembly to the extreme right end passageway (FIG. 4). The photographer can then proceed to expose the second row of passages, and thereafter the mounting plate 44 is lowered and the operations are repeated until all of the film sections have been exposed. The film may then be removed and replaced and the sequence repeated.

It should now be apparent that a highly versatile multiple-exposure camera is provided by the present invention. The unique construction of the lens supporting and moving means provides an assembly which is well sealed against the entrance of unwanted light for all positions of the lens with respect to the film. Moreover, the interchangeable insert blocks provide for wide variation in the number of exposures which can be made on a particular area of film as well as in the shape and size of each exposure.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. In a multiple exposure camera of the type having a housing wherein different portions of a single photosensitive surface are successively exposed to an image projected from a lens and wherein said lens is mounted on a slide assembly which is adapted to be moved in a plane parallel to said photosensitive surface and wherein a detachably mounted block having a plurality of passages extending therethrough in a first configuration is positioned between said lens and said photosensitive plane whereby different portions of said photosensitive surface are exposed to an image passing through said lens as said slide assembly is moved to align said lens with a different one of said passages, the improvement which comprises, indexing means coupled to said slide assembly and positioned between said lens and said block and adapted to move with said slide assembly, said indexing means having a light tight detent surface juxtapositioned to said block, and said detachable block having a cooperating light tight detent surface surrounding each of said passages whereby said light tight detent surface on said indexing means will only engage said complementary light tight detent surface on said detachable block when said slide assembly is aligned with one of said passages.

2. The camera as recited in claim 1 wherein said lens and said slide assembly are mounted in a front section of said housing and said detachably mounted block and said photosensitive surface are mounted in a rear section of said housing, said front and rear sections being pivotally connected together for taking pictures whereby said rear section may be pivotally separated from said front section to permit removal of said detachably mounted block and insertion of another detachably mounted block having a second configuration of passages.

3. The camera as recited in claim 1 wherein said indexing means comprises detent plate means projecting into and insertable in said slide assembly, said detent plate means being adapted to slidingly contact a surface of said block facing said slide assembly, said surface of said block including recessed portions, said detent plate means including projecting portions adapted to engage and cooperate with recessed portions of said block so as to provide predetermined aligned positions and detenting of said lens relative to said passages.

4. A camera as defined in claim 3 wherein said recessed portions comprise V-shaped notches in said surface of said block, and said projecting portions on said detent means comprise V-shaped projections adapted to mate with said notches in said block.

5. The camera as defined in claim 4 wherein said V-shaped notches in said block have an apex angle of at least 90°.

6. The camera as defined in claim 3 including detent block means for positioning said detent plate means in said slide assembly, and resilient biasing means interposed between said detent block means and said detent plate means, said biasing means being adapted to impart a compressive contacting force between said detent plate means and said surface of said block.

7. A camera as defined in claim 6 including aperture means in said detent plate means and said resilient biasing means comprising a compressed coil spring positioned within said aperture means.

References Cited

UNITED STATES PATENTS

| | | | |
|---|---|---|---|
| 615,064 | 11/1898 | Dwight | 95—37 |
| 620,036 | 2/1899 | Jenkins | 95—37 |
| 645,691 | 3/1900 | Peters | 95—37 |
| 766,967 | 8/1904 | Newman | 95—37 |
| 1,893,439 | 1/1933 | Ogden | 95—36 X |
| 2,335,697 | 11/1943 | Reyniers | 95—37 X |

JOHN M. HORAN, Primary Examiner

U.S. Cl. X.R.

355—53